United States Patent [19]

Miller

[11] Patent Number: 6,040,784
[45] Date of Patent: *Mar. 21, 2000

[54] ALPHANUMERIC PAGING MESSAGE SYSTEM OPERATING ON INTERNET

[75] Inventor: Nicholas R. Miller, West Vancouver, Canada

[73] Assignee: Datalink Systems Corporation, San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/813,925

[22] Filed: Mar. 7, 1997

[51] Int. Cl.[7] ....................................... G08B 5/22

[52] U.S. Cl. ..................... 340/825.44; 455/38.1

[58] Field of Search ................. 340/825.44, 825.07, 340/825.15, 825.17; 379/93.24; 455/31.2, 38.1; 395/200.36

[56] References Cited

U.S. PATENT DOCUMENTS 5,487,100  1/1996  Kane ................................. 340/825.44
5,675,507  10/1997 Bobo, II .............................. 395/200.36

*Primary Examiner*—Michael Horabik
*Assistant Examiner*—Jean B. Jeanglaude
*Attorney, Agent, or Firm*—Donald R. Boys; Central Coast Patent Agency

[57] ABSTRACT

A message-sending system provides for entering an identifier uniquely associated with an intended recipient and a message for the intended recipient in a WEB page, and associating the identifier with the intended recipient's pager routing information from a database accessible to a WEB Server providing the WEB page. A successful association leads to formatting a pager message for the intended recipient, and forwarding the formatted message to a pager system serving the intended recipient. In some embodiments success or failure of the pager message is reported back to the original sender.

9 Claims, 2 Drawing Sheets

6,040,784

ALPHANUMERIC PAGING MESSAGE SYSTEM OPERATING ON INTERNET

FIELD OF THE INVENTION

The present invention is in the area of electronic paging systems, and pertains more particularly to delivering alphanumeric messages to pagers.

BACKGROUND OF THE INVENTION

At the time of the present invention the publicly accessible wide-area network well-known as the Internet, World Wide Web (WWW), or more simply the Web has demonstrated great success, and continues to grow at a rapid rate. Individuals, businesses, public and private agencies and the like are depending on the Web for quick access to information and for rapid transfers of large amounts of data of all sorts. According to experts and analysts phenomenal growth and development of new Web products is virtually certain to continue.

Also at the time of the present invention, the use of paging systems continues to grow as well. Paging systems, as is well-known in the art, are systems wherein users may carry small electronic devices (pagers), which are receivers for RF transmitters arranged in matrices to cover a relatively broad geographic area. Information for an individual subscriber to a paging service is delivered to a central location controlled by the company providing the service, and broadcast to a matrix of regional transmitters covering the geographical area where the subscriber is likely to be. The information is keyed to the individual's pager, and typically displayed on a small LCD screen of the pager. Transmission from the central location to the matrix of local transmitters is typically by satellite uplink and downlink.

The functionality of paging service differs in the type of information which may be delivered. In one familiar mode, one may call a paging company from a touch-tone telephone (or a telephone call may be diverted and forwarded to a paging service), and then enter (usually at a prompt) a telephone number for the intended recipient to call. The telephone number is then broadcast by the paging service to the matrix of transmitters and rebroadcast to be received by the intended recipient's pager. The number is displayed on a display screen of the pager.

The telephone system as described immediately above is not very practicable, however, for longer alphanumeric messages. For systems that actually deliver messages instead of only return phone numbers, a different mode of delivering the message to the paging service provider is necessary. In many instances a paging terminal or special software operating on a PC is needed, wherein messages are entered from the keyboard associated with the terminal or PC, and then delivered as machine operable text to the paging service provider's central location by means of a modem over the public switched telephone network (PSTN). In some few instances known to the inventor, users may send an e-mail message to an address not specifically associated with an individual. The e-mail message sent must have considerable routing information, such as paging network, PIN number, and the like relative to the intended recipient.

What is clearly needed is a simplified and direct way for users to send alphanumeric messages to recipients carrying pagers.

SUMMARY OF THE INVENTION

In a preferred embodiment of the present invention a message delivery system is provided, comprising a WEB page on a WEB Server having an input interface adapted for a message sender to enter an identifier particular to an intended recipient and an alphanumeric message; a pager message preparation facility operating on the WEB server adapted to integrate the identifier and message from the input interface with data retrieved from a database, matching routing information for the intended recipient with the identifier, thereby providing a pager message for the intended recipient; and a pager message sending facility adapted to send the prepared pager message to a paging system to be transmitted to a pager associated with the intended recipient. The identifier can be any one of several pieces of information particular to the intended recipient, such as e-mail address, social security number, business phone number, and the like. In some embodiments the message delivery system is further adapted to return a message to the message sender via the WEB page, announcing result of the pager message transmission.

In another aspect a WEB page is provided, comprising an input interface for a message sender to enter an identifier for an intended recipient, which may be such as the recipient's e-mail; and a signal input for the message sender to initiate forwarding the message to a paging service. In some embodiments the WEB page further an announcement field for announcing to the message sender success or failure of a pager message sent.

In yet another aspect a method for sending an alphanumeric pager message from a message sender's computer is provided, comprising steps of (a) entering an identifier for the intended recipient, which may be the recipient's e-mail address, in a first entry field in a WEB page transmitted to the sender's computer from a WEB Server; (b) entering an alphanumeric message for the intended recipient in a second entry field in the WEB page; (c) associating the identifier at the WEB server with pager routing information for the intended recipient; and (d) formatting the alphanumeric message and routing information at the WEB Server into a form required for a pager message, and forwarding the formatted pager message to a paging system to be transmitted to the intended recipient. In some embodiments the method further comprises a step of receiving a result of the pager message sent at the WEB server, and sending a result message back to the message sender via the WEB page.

Many advantages over current art are attained by practicing the present invention in its various embodiments. For example, the sender does not need to know any routing information for an intended recipient, other than the unique identifier; and there is no need to enter such information. Further, the system is transparent to the sender as far as the recipient's pager service provider is concerned, and seamless message sharing is maintained even if the recipient changes services, without having to send new information to all senders of messages., The change need be reported only once to the Message Express WEB Server.

BRIEF DESCRIPTION OF THE DRAWING FIGURES

DESCRIPTION OF THE PREFERRED EMBODIMENTS

In a preferred embodiment of the invention a method and system is provided wherein a user may send an alphanumeric message to an intended recipient without having to enter, or even have knowledge of, the intended recipient's pager network, access number(s), PIN number(s) and the like. In this system, in a preferred embodiment, embedded code in a WEB browser executing on a user's personal computer (PC) is used to send a message to an intended recipient based on an identifier unique to the intended recipient. In a preferred embodiment the identifier is the intended recipient's actual e-mail address. In various embodiments described herein, notice is taken that programming of Web servers, WEB pages, and the like, and the use of software such as CTI programs is generally well-known in the art, so no attempt has been made herein to describe such operations in minute detail. It is certain that those with skill in the art, having been taught the specifics of the invention as described herein, will be able to practice the invention using information and procedures within the known ordinary skill level.

Figure 1:
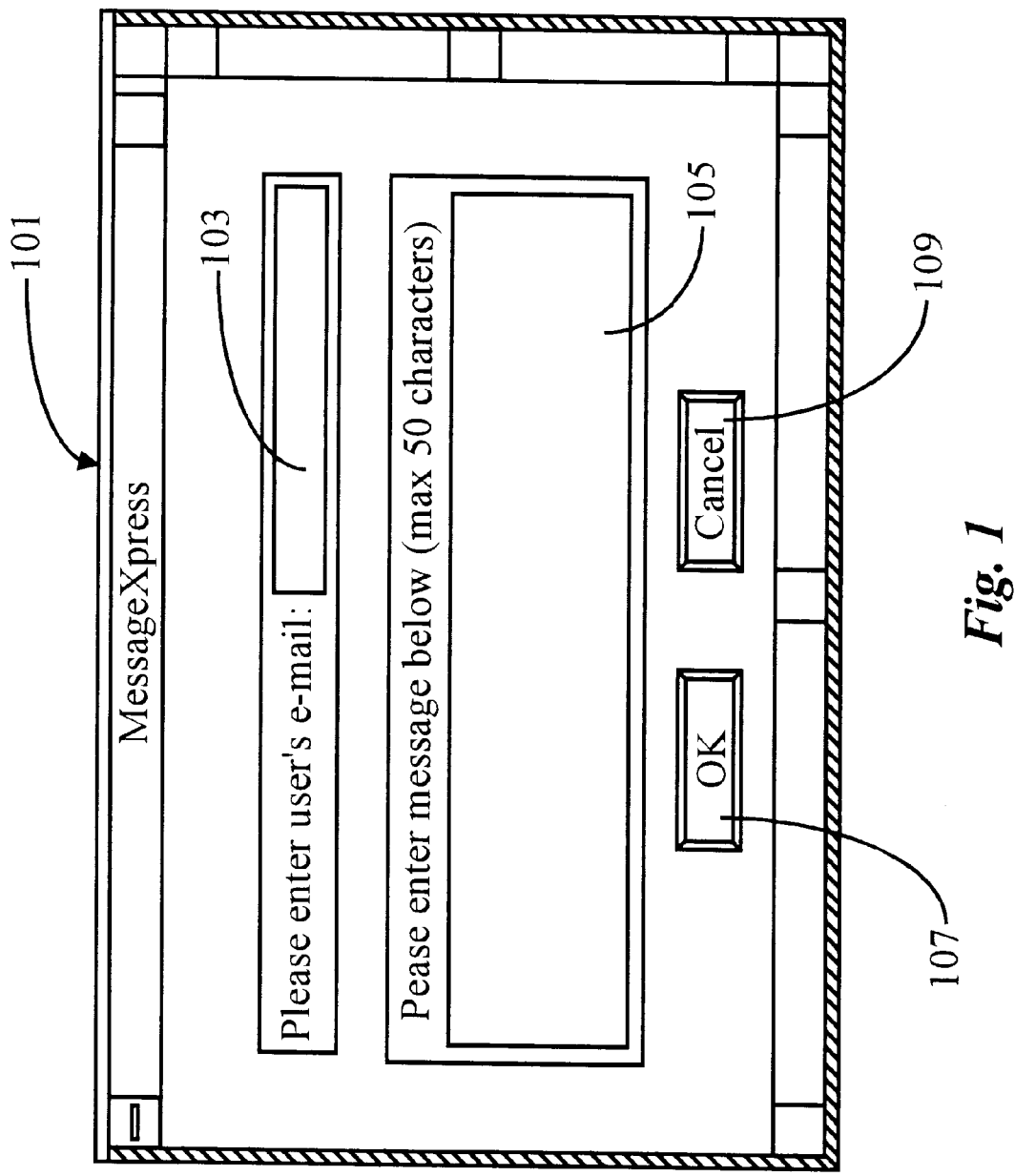
FIG. 1 is an example of a Web Browser interface screen according to a preferred embodiment of the present invention.

FIG. 1 is an example of an input interface according to a preferred embodiment of the present invention, providing input for a message system termed Message Express by the inventor. In this system a person who wishes to send a message to an intended recipient known to be (or thought to be) a subscriber to Message Express, connects to the Internet through his Internet Service Provider (ISP), and accesses the Message Express WEB page on an Internet Server by use of any suitable WEB browser. The sender may of course have the Message Express URL in a bookmark, or even have a Macro or Startup script for going to the Message Express WEB page.

Once at the Message Express WEB page an input interface window 101 is provided as shown exemplary in FIG. 1. Those with skill in the art will recognize that there are many forms this window might take to serve the functions described below. In this example an input field 103 is provided to accept the identifier associated with the intended recipient. The identifier can be typed in, or selected from an address book using procedures well-known in the art. A second field 105 is provided for entering an alphanumeric message of (in this example) up to 50 characters. It will be apparent to those with skill in the art that in other embodiments shorter or longer message limits may be imposed.

Once an identifier and a message are entered the user activates the Message Express by clicking OK button 107. A cancel button 109 is provided for terminating the process without activating the message express. Clicking the OK button invokes a Computer Telephony Interface (CTI) program on the Message Express WEB Server.

Figure 2:
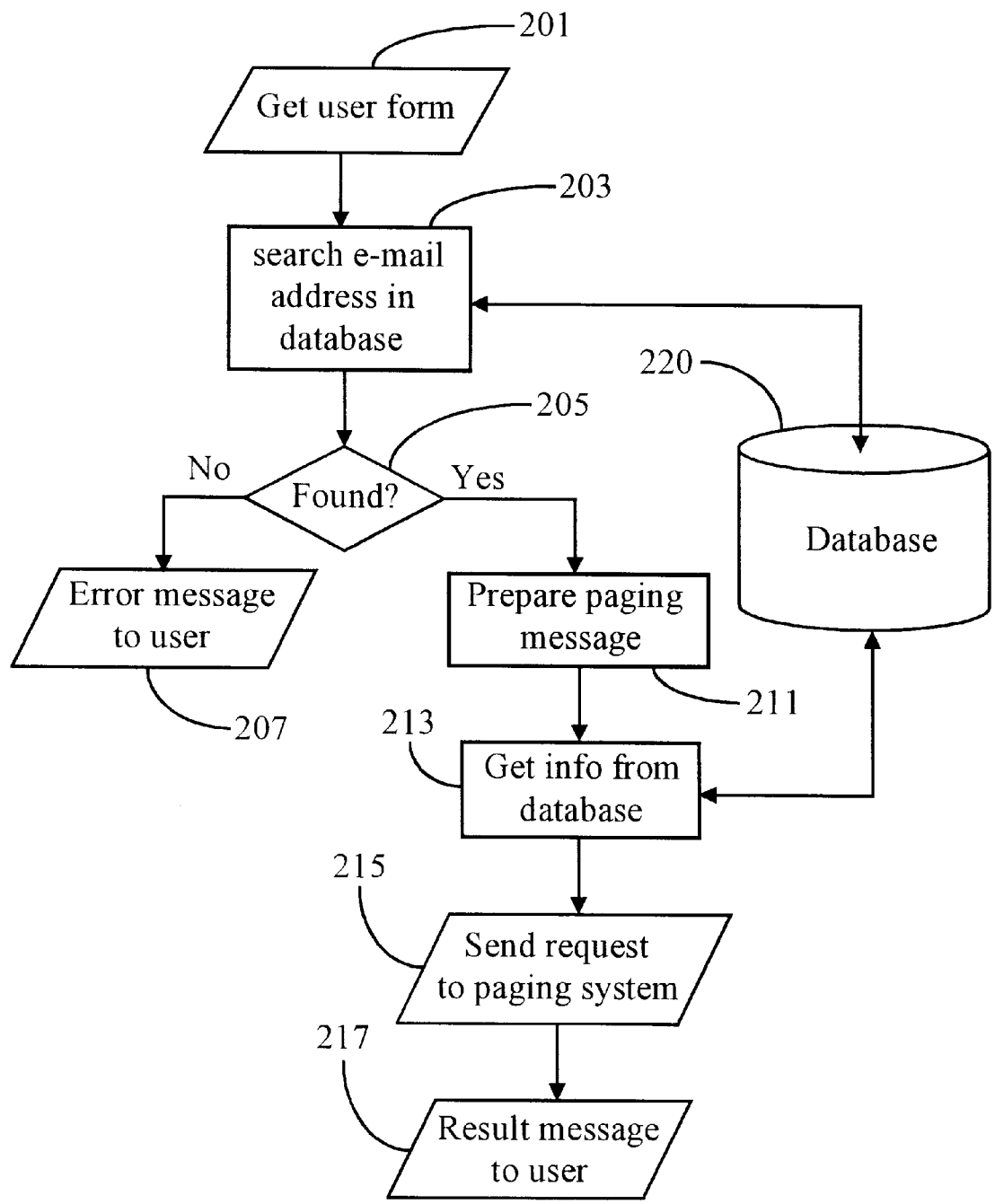
FIG. 2 is a process flow diagram illustrating an operation in practicing a preferred embodiment of the present invention.

The process of the CTI program on the WEB Server is illustrated by the flow diagram of FIG. 2. At step 201 the user-form of FIG. 1 is received, that is, the process is initiated by a user having entered an identifier and a message, and having clicked on the OK button in this example.

At step 203 the system accesses a database accessible to the Web Server wherein data pertaining to registered recipients (subscribers) is stored. This data associates the subscriber's pager network, access code(s), PIN number(s) and so forth with the subscriber's identifier. At step 205 it is determined if a match was made in the database for the identifier entered and a subscriber.

If the identifier is for a registered subscriber, control passes to step 211, and the data received in the form (alphanumeric message) is formatted into the form required by the registered recipient's paging service. If there is no match found, an error message is returned to the sender of the message, so the sender can either correct the identifier or conclude that the intended recipient is not a subscriber to the Message Express.

At step 213 the Message Express retrieves routing information from the database pertinent to the intended recipient and to the paging system that will be accessed to page the recipient. At step 215 the formatted and prepared message is sent to the paging system, which can be any kind of PC that is set up to send messages to pagers.

Once the formatted message is sent to the paging system and forwarded to the intended recipient, a return is typically made. The return is usually that the page was sent and received, but, in some cases there may be a problem. For example, the intended recipient may be outside the geographic area covered by the paging system, the pager may be turned off, or there may be a formatting or addressing problem.

At step 217 the result of the page effort, success or failure and reason for failure, is sent back to the user's (sender's) screen on the WEB page displayed on the video display at the sender's PC. The user is thus informed whether the message was successfully sent.

The Message Express system maintains database 220 and makes updates on a regular basis, so any subscriber may change services or parameters and report the change to the Message Express system so the database may be updated and that subscriber may continue to receive valuable messages over the Message Express.

It will be apparent to those with skill in the art that there are many alterations that might be made in the embodiments described herein without departing from the spirit and scope of the invention. Some of those alterations have been described, such as the variance that may be allowed in the number of characters which may constitute a message in the Message Express system. There are many other such alterations that might be made. For example, it is well-known that programmers are an individualistic lot, and that there are many ways that code might be provided to accomplish the functions described for the invention herein. There are similarly many forms the input interface described exemplary by FIG. 1 might take. The window of FIG. 1 is a single example of many forms within the spirit and scope of the invention. The order of steps as described in FIG. 2 might change within the spirit of the invention as well. Further, database 202 may take many forms. There are many other such alterations possible within the spirit and scope of the invention, and the invention is limited only by the claims which follow.

What is claimed is:

1. A message delivery system, comprising:
   a WEB page on a WEB Server having an input window on the WEB page, the input window comprising a first input text field for entering identity of an intended recipient, and a second input text field for entering an alphanumeric message;
   a pager message preparation facility operating on the WEB server integrating the identifier and message from the input windows on the WEB page with data retrieved from a database, matching routing information for the intended recipient with the identifier, thereby providing a pager message for the intended recipient; and
   a pager message sending facility sending the prepared pager message to a paging system to be transmitted to a pager associated with the intended recipient.

2. The message delivery system of claim 1 wherein the identifier is the intended recipient's e-mail address.

3. The message delivery system of claim 1 having a function for returning a message to the message sender via the WEB page, announcing result of the pager message transmission.

4. A Web page comprising:

an input window having a first input text field for a message sender to enter an identifier uniquely associated with an intended recipient, and a second input text field for the message sender to enter a message to be passed to the intended recipient; and a signal input for the message sender to initiate forwarding the message to a paging service.

5. The WEB page of claim 4 wherein the identifier is the intended recipient's e-mail address.

6. The WEB page of claim 4 further comprising an announcement field for announcing to the message sender success or failure of a pager message sent.

7. A method for sending an alphanumeric pager message from a message sender's computer, comprising steps of:

(a) entering an identifier uniquely associated with an intended recipient in a first entry field in a window on a WEB page transmitted to the sender's computer from a WEB Server;

(b) entering an alphanumeric message for the intended recipient in a second entry field in the window on the WEB page;

(c) associating the identifier at the WEB server with pager routing information for the intended recipient; and (d) formatting the alphanumeric message and routing information at the WEB Server into a form required for a pager message, and forwarding the formatted pager message to a paging system to be transmitted to the intended recipient.

8. The method of claim 7 wherein the identifier is the intended recipient's e-mail address.

9. The method of claim 7 further comprising a step for receiving a result of the pager message sent at the WEB server, and sending a result message back to the message sender via the WEB page.

* * * * *